(12) United States Patent
Kranner

(10) Patent No.: US 7,480,535 B2
(45) Date of Patent: Jan. 20, 2009

(54) METHOD FOR THE COMPUTER-SUPPORTED GENERATION OF PROGNOSES FOR OPERATIVE SYSTEMS AND A SYSTEM FOR THE GENERATION OF PROGNOSES FOR OPERATIVE SYSTEMS

(76) Inventor: Gerhard Kranner, Rudolf-Jankostrasse 16, A-2380 Perchtoldsdorf (AT)

( * ) Notice: Subject to any disclaimer, the term of this patent is extended or adjusted under 35 U.S.C. 154(b) by 629 days.

(21) Appl. No.: 10/529,610

(22) PCT Filed: Sep. 29, 2003

(86) PCT No.: PCT/AT03/00289

§ 371 (c)(1),
(2), (4) Date: Apr. 25, 2005

(87) PCT Pub. No.: WO2004/029738

PCT Pub. Date: Apr. 8, 2004

(65) Prior Publication Data

US 2006/0009864 A1    Jan. 12, 2006

(30) Foreign Application Priority Data

Sep. 30, 2002   (AT) ............................... A 1472/2002

(51) Int. Cl.
*G05B 13/02* (2006.01)
*G06E 1/00* (2006.01)
(52) U.S. Cl. .......................................... 700/28; 706/21
(58) Field of Classification Search .................. 700/276; 62/126
See application file for complete search history.

(56) References Cited

U.S. PATENT DOCUMENTS 5,541,590 A    7/1996   Nishio
(Continued)

FOREIGN PATENT DOCUMENTS

DE    197 42 902 A1    4/1999
(Continued)

OTHER PUBLICATIONS

An innovative hydraulic turbine governor for predictive maintenance of hydropower plant Changyu Liu; lung, B.; Luqing Ye; Morel, G.; Decision and Control, 2002, Proceedings of the 41st IEEE Conference on vol. 1, Dec. 10-13, 2002 pp. 925-930 vol. 1.*

(Continued)

*Primary Examiner*—Michael B Holmes
(74) *Attorney, Agent, or Firm*—Laurence A. Greenberg; Werner H. Stemer; Ralph E. Locher

(57) ABSTRACT

The invention relates to a method for the computer-supported generation of prognoses for operative systems (37), in particular for control processes and similar, based on multi-dimensional data sets describing a system, product and/or process condition, using the SOM method in which an ordered grid of nodes (1), representing the data distribution is determined and an internal scaling ($\sigma_j$) of variables ($x_j$) with regard to non-linearity in the data, based on the non-linear influence of each variable on the prognosis variable, is carried out. Local receptive regions corresponding to the nodes (1) are determined, on the basis of which local linear regressions are calculated. Using the number of local prognosis models obtained thus, optimized prognosis values for the control of the operative system (37) are calculated, whereby for each new data set the relevant sufficient nodes are determined and the local prognosis model applied to this data set.

24 Claims, 6 Drawing Sheets

U.S. PATENT DOCUMENTS

| | | | | |
|---|---|---|---|---|
| 7,026,121 B1 * | 4/2006 | Wohlgemuth et al. | ........... | 435/6 |
| 7,117,208 B2 * | 10/2006 | Tamayo et al. | ................. | 707/6 |
| 7,118,853 B2 * | 10/2006 | Botstein et al. | ................ | 435/4 |
| 7,139,739 B2 * | 11/2006 | Agrafiotis et al. | ............. | 706/20 |
| 7,188,055 B2 * | 3/2007 | Agrafiotis et al. | ............. | 703/2 |
| 7,223,234 B2 * | 5/2007 | Stupp et al. | ................ | 600/300 |
| 7,235,358 B2 * | 6/2007 | Wohlgemuth et al. | .......... | 435/6 |
| 7,249,117 B2 * | 7/2007 | Estes | ........................... | 706/52 |
| 7,251,568 B2 * | 7/2007 | Pittman et al. | ................ | 702/19 |
| 7,251,637 B1 * | 7/2007 | Caid et al. | .................... | 706/15 |
| 7,269,517 B2 * | 9/2007 | Bondarenko | ................ | 702/19 |
| 7,289,985 B2 * | 10/2007 | Zeng et al. | ..................... | 707/3 |
| 7,293,002 B2 * | 11/2007 | Starzyk | ........................ | 706/15 |
| 7,311,666 B2 * | 12/2007 | Stupp et al. | ................. | 600/300 |
| 7,318,051 B2 * | 1/2008 | Weston et al. | ................. | 706/12 |
| 7,318,501 B2 * | 1/2008 | Felder | ........................ | 187/414 |
| 7,333,963 B2 * | 2/2008 | Widrow et al. | ................ | 706/18 |
| 7,340,485 B2 * | 3/2008 | Varpela et al. | ........... | 707/104.1 |
| 7,343,222 B2 * | 3/2008 | Solomon | .................... | 700/245 |
| 7,343,247 B2 * | 3/2008 | Hood et al. | .................... | 702/19 |
| 7,400,981 B1 * | 7/2008 | Rigney | ......................... | 702/19 |
| 7,424,370 B2 * | 9/2008 | Sachdeva et al. | .............. | 702/19 |

FOREIGN PATENT DOCUMENTS

| | | | |
|---|---|---|---|
| EP | | 0 749 014 A1 | 12/1996 |
| WO | WO 01/80176 A2 | | 10/2001 |

OTHER PUBLICATIONS

A multilayer-architecture for SNMP-based, distributed and hierarchical management of local area networks Konopka, R.; Trommer, M.; Computer Communications and Networks, 1995. Proceedings., Fourth International Conference on Sep. 20-23, 1995 pp. 272-279 Digital Object Identifier 10.1109/ICCCN.1995.540129.*

Prediction of performance and processor requirements in real-time data flow architectures Som, S.; Mielke, R.R.; Stoughton, J.W.; Parallel and Distributed Systems, IEEE Transactions on vol. 4, Issue 11, Nov. 1993 pp. 1205-1216 Digital Object Identifier 10.1109/71. 250100.*

Accelerating Full-System Simulation through Characterizing and Predicting Operating System Performance Seongbeom Kim; Fang Liu; Yan Solihin; Iyer, R.; Li Zhao; Cohen, W.; Performance Analysis of Systems & Software, 2007. ISPASS 2007. IEEE International Symposium on Apr. 25-27, 2007 pp. 1-11 Digital Object Identifier 10.1109/ISPASS.2007.36373.*

A data mining based algorithm for traffic network flow forecasting Xiaoyan Gong; Xiaoming Liu; Intelligent Transportation Systems, 2003. Proceedings. 2003 IEEE vol. 1, 2003 pp. 193-198 vol. 1 Digital Object Identifier 10.1109/ITSC.2003.1251947.*

A data mining based algorithm for traffic network flow forecasting Xiaoyan Gong; Xiaoming Liu; Integration of Knowledge Intensive Multi-Agent Systems, 2003. International Conference on Sep. 30-Oct. 4, 2003 pp. 243-248 Digital Onject Identifier 10.1109/ KIMAS.2003.1245052.*

Program counter-based prediction techniques for dynamic power management Gniady, C.; Butt, A.R.; Hu, Y.C.; Yung-Hsiang Lu; Computers, IEEE Transactions on vol. 55, Issue 6, Jun. 2006 pp. 641-658 Digital Object Identifier 10.1109/TC.2006.87.*

Using multiple predictors to improve the accuracy of file access predictions Whittle, G.A.S.; Paris, J.-F.; Amer, A.; Long, D.D.E.; Burns, R.; Mass Storage Systems and Technologies, 2003. (MSST 2003). Proceedings. 20th IEEE/11th NASA Goddard Conference on Apr. 7-10, 2003 pp. 230-240.*

* cited by examiner

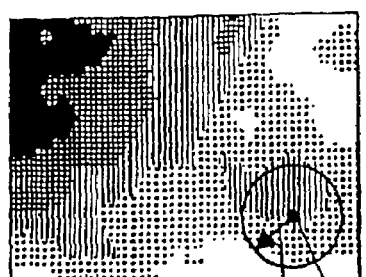
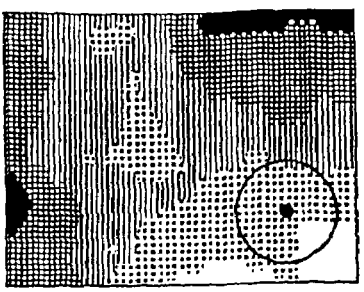
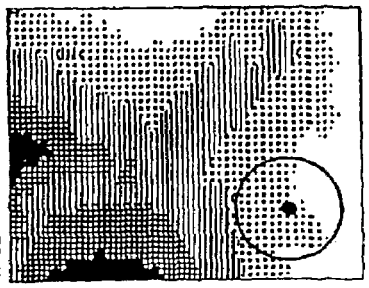
V  r  l    K    T
FIG. 9A    FIG. 9B    FIG. 9C
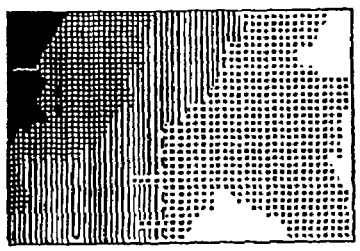
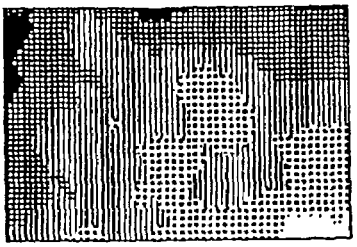
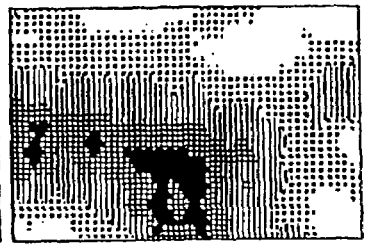
V    K    T
FIG. 10A    FIG. 10B    FIG. 10C
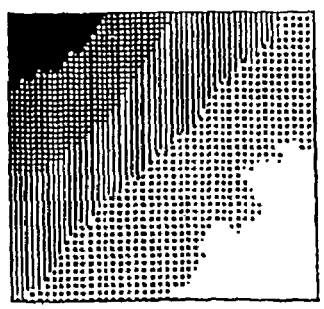
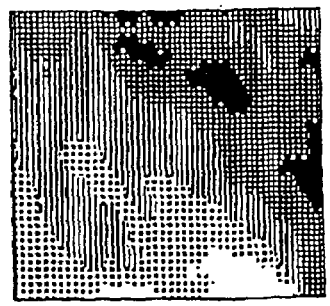
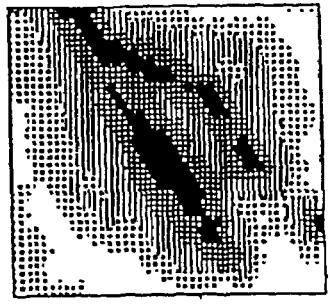
V    $\beta_V^{(l)}$    $r_{opt}$
FIG. 11A    FIG. 11B    FIG. 11C

METHOD FOR THE COMPUTER-SUPPORTED GENERATION OF PROGNOSES FOR OPERATIVE SYSTEMS AND A SYSTEM FOR THE GENERATION OF PROGNOSES FOR OPERATIVE SYSTEMS

BACKGROUND OF THE INVENTION

Field of the Invention

The invention relates to a method for computer-aided generation of prognoses for operative systems, in particular for control processes and the like, on the basis of multidimensional data records describing the state of a system, product and/or process, and applying the SOM method in which an ordered grid of nodes representing the data distribution is determined.

Furthermore, the invention relates to a system for the generation of prognoses for operative systems, in particular for control processes, on the basis of multidimensional data records describing a state of a system, product and/or process, having a database for storing the data records, and having an SOM unit for determining an ordered grid of nodes representing the data distribution.

Numerous control techniques in operative systems, for example in the case of industrial application, or else the automation of marketing measures as far as financial trading systems are based on automatic units for the generation of prognoses of specific parameters of features, quality or systems. The accuracy and reliability of such prognosis units is for the most part an essential precondition for the efficient functioning of the entire control.

The implementation of the prognosis models therefor is frequently performed on the basis of classical statistical methods (so-called multivariant models). However, the relationships that should be recorded in the basic prognosis models are frequently of a nonlinear nature. The conventional statistical methods on the one hand cannot be directly applied for these prognosis models, and on the other hand can be automated only with difficulty as nonlinear statistical extensions.

Consequently, in order to model nonlinear dependences recourse has been made in part to methodological approaches from the field of artificial intelligence (genetic algorithms, neural networks, decision trees etc.) that promise a better exhaustion of the information in nonlinear relationships. Prognosis models that are based on these methods are scarcely used, for example, in automated systems because their efficiency and stability and/or reliability generally cannot be ensured. One reason for this is the absence of statistically reliable statements on the limits of the efficiency and validity of black box models, that is to say in problems relating to overfitting, generalizability, explanation components etc.

The present technique is based on the use of the so-called SOM (SOM—Self-Organizing-Maps) method. This SOM method, which is used as a basis for nonlinear data representations, is well known per se, compare T. Kohonen, "Self-Organizing Maps", 3rd. edition, Springer Verlag Berlin 2001. Self-organizing maps constitute a non-parametric regression method by means of which data of any desired dimension can be mapped into a space of lower dimension. The original data are abstracted in the process.

The most commonly used method for data representation or else for visualization in the case of the SOM method is based on a two-dimensional hexagonal grid of nodes for representing the SOM. Starting from a number of numerical multivariant data records, the nodes of the grid are continuously adapted to the form of the data distribution during an adaptation operation. Because of the fact that the arrangement of the nodes among one another reflects the neighborhood inside the data volume, features and properties of the data distribution can be read directly from the ensuing "landscape". The resulting "map" constitutes a representation of the original data distribution that retains local topology.

The following example can be produced to explain the SOM method:

Assume there are 1000 persons on a football field who are randomly distributed on the playing area. 10 features (for example sex, age, body size, income etc.) are now defined which are to be used to intercompare all the 1000 persons. They converse and exchange places until each of them is surrounded by persons who is most similar to him/her with reference to the defined comparative properties. A situation is thereby reached in which each of the participants is most similar to his immediate neighbor with reference to the totality of the features.

This renders plain how it is possible to come to a two-dimensional representation despite the multidimensionality of the data. With this distribution of the persons on the playing field, it is now possible to represent each of the features two-dimensionally (for example in a color-coded fashion). In this case, the color range of the values reaches from blue (lowest-level expression of the feature) to red (highest-level expression of the feature). If all the features are visualized in this way, a colored map is obtained from which the distribution of the respective features, that is to say variables, can be detected visually. It is to be noted in this case that irrespective of the feature considered a person (or a data record) is positioned at exactly one site on the football field.

Further features can also be associated with a finished SOM; in this case, features of the data records that are not taken into account when calculating the SOM are represented graphically just like features that have been included in the SOM. The distribution of the data records within the SOM no longer changes in this case.

One application of SOM is described in WO 01/80176 A2, in which the aim is pursed of dividing a total data volume into partial data volumes in order then to calculate prognosis models on them. However, the aim here is to raise the performance of the calculation by distributing the computing load over a number of computers. Although this method is also based in part on SOMs, this is not for the purpose of optimizing the quality of prognosis, but (first and foremost) for the purpose of shortening the calculating time through the distributed computation and the subsequent combination of the individual models. The method of prognosis used in this case is based, in particular, on the so-called Radial Basis Function (RBF) networks that are associated with a special SOM variant that optimizes the entropy of the SOM representation.

Furthermore, another application of the SOM method is known from DE 197 42 902 A1, specifically in the planning and carrying out of experiments, although here the aim is specifically a process monitoring with the use of SOM without any sort of prognoses.

SUMMARY OF THE INVENTION

It is an object of the invention to provide a method and a system of the type presented at the beginning with the aid of which it is possible to achieve a high efficiency and an optimization of the accuracy of the prognoses in order thus to enable a high level of efficiency of the control application based thereon in the respective operative system; it is aimed as a consequence to be able thereby to obtain products of higher quality in fabrication processes, for example.

The method according to the invention and of the type presented at the beginning is characterized in that in order to take account of nonlinearities in the data an internal scaling of variables is undertaken on the basis of the nonlinear influence of each variable on the prognosis variable, in that local receptive regions assigned to the nodes are determined on the basis of which local linear regressions are calculated, and in that optimized prognosis values for controlling the operative system are calculated with the aid of the set of local prognosis models that is thus obtained, this being done by determining the respectively adequate node for each new data record and applying the local prognosis model to this data record.

In a corresponding way, the system according to the invention and of the type specified at the beginning is characterized in that the SOM unit is assigned a nonlinearity feedback unit for the internal scaling of variables in order to compensate its nonlinear influence on the prognosis variable, as well as a calculation unit for determining local linear regressions on the basis of local receptive regions assigned to the nodes, optimized prognosis values being calculated in a prediction unit on the basis of the local prognosis models thus obtained, this being done by determining the respectively adequate node for each new data record and applying the local prognosis model to this data record.

In accordance with the invention, the data space is therefore firstly decomposed into microclusters, and thereafter an optimum zone which is respectively as homogeneous as possible is determined about these clusters for the regression. Different local regressions are subsequently calculated in all these zones and are then applied individually for each data record for which it is intended to calculate a prognosis, depending respectively on the microcluster in which it comes to lie or to which it belongs.

The particular efficiency of the present prognosis technique is consequently achieved by the adaptation of classical statistical methods such as regression analysis, principal component analysis, cluster analysis to the specific facts of SOM technology. With the local linear regression, the statistical regression analysis is respectively applied only to a portion of the data, this portion being determined by the SOM, that is to say by the "neighborhood" in the SOM map. It is possible within this subset to generate a regression model that is substantially more specific than a single model over all the data. Many local regression models with overlapping data subsets are generated overall for a prognosis model. It is always only the "closest" model that is used in determining a prognosis value.

The present technique therefore combines the capacity of the self organizing maps (SOMs) for nonlinear data representation with the calculation of the multivariant statistics, in order to raise the efficiency of the prognosis models, and to optimize the use of differentiated, distributed prognosis models in automated control systems. The difficulties of the known proposed solutions are overcome in this case by departing from a purely methodological approach. The function of integrated prognosis models, in particular their automated application in control processes—is decomposed into individual action areas that are detached independently and finally joined in a novel fashion into a functional whole.

In a departure from the prior art, the invention also takes account of the circumstance that individual variables can have a different, nonlinear influence on the prognosis variable; in order to take account of these nonlinearities in the data, and to provide an at least far reaching compensation therefor, a nonlinearity analysis is carried out on the basis of a global regression in conjunction with local prognosis models, nonlinearity measures being derived from which scaling factors for internal scaling are determined in order to take account of the given nonlinear relationships. The optimized SOM representation is generated after this internal scaling has been carried out.

It is of particular advantage in this connection when for each variable a dimension is formed for its order in the SOM representation and a dimension is formed for its contribution to the explained variance, new internal scalings being determined from these dimensions on the basis that the estimated change in the explained variance is maximized by varying the internal scalings, as a result of which the variables are ordered in the resulting SOM representation in accordance with their contributions to the explained variance and so that existing nonlinearities are more accurately resolved.

A certain margin that is bounded by the required significance, on the one hand, and by the necessary stability, on the other hand, is present during the determination of the respective receptive regions (or receptive radii, which define these regions). Within these bounds, it is possible to find an optimum receptive region for which the variance of the residues is minimal. According to the invention, it is therefore advantageous in particular when the receptive regions assigned to the nodes are being determined, if their magnitude is respectively selected to be so large that the explained variance of the local regression is maximal in conjunction with simultaneous safeguarding of significance and stability in the region of the node. It is particularly advantageous in this case when the receptive regions assigned to the nodes are being determined, if it is in each case the smallest necessary receptive region that is selected for the significance of the regression, and the largest possible receptive region that is selected for maximizing the accuracy of prognosis.

It has also proved to be advantageous when the internal scaling is carried out iteratively.

It is advantageous, furthermore, according to the invention when the supplied data are subjected in advance to a compensating scaling in order at least partially to compensate any possible correlations between variables. Starting values that can be used effectively are obtained in this way for the further processing. It has proved to be an advantageous mode of procedure in this case when the individual data records are rescaled for the purpose of the compensating scaling, the values of a respective variable of all the data records being standardized, after which the data are transformed into the principal component space and the compensating scalings of the individual variables are calculated on the basis that the distance measure in the original variable space differs minimally from the distance measure in the standardized principal component space. Furthermore it is consequently also advantageous for the purpose of simplifying the method when the compensating scaling is multiplicatively combined with the internal scaling, which takes account of the nonlinearities in the data, in order to form a combined variable scaling on which an SOM representation modified in accordance therewith is based.

Advantageous for the respective process control is a special embodiment of the system according to the invention that is characterized in that connected to the prediction unit are a number of control units that are assigned to individual process states and predict the process results that would arise for the current process data.

It is also advantageous here when respectively separately assigned process units for deriving control parameters on the basis of the predicted process results and of the desired values for the process respectively to be carried out in the operative system are connected to the control units.

BRIEF DESCRIPTION OF THE DRAWING

The invention is explained in yet more detail below with the aid of particularly preferred exemplary embodiments, to which, however, it is not intended to be limited, and with reference to the drawing, in which:

FIG. 9 shows in the partial FIGS. 9A, 9B and 9C, SOM representations for different variables in an exemplary continuous steel casting process;

FIG. 10 shows in the partial FIGS. 10A, 10B and 10C corresponding SOM maps after a second iteration step has been run through;

FIG. 11 shows the SOM representation for one of the variables after a second iteration step, the ordering of the data (FIG. 11A), the nonlinear influence (FIG. 11B) and the distribution of the receptive radii (FIG. 11C) being shown.

DESCRIPTION OF THE PREFERRED EMBODIMENTS

Figure 1:
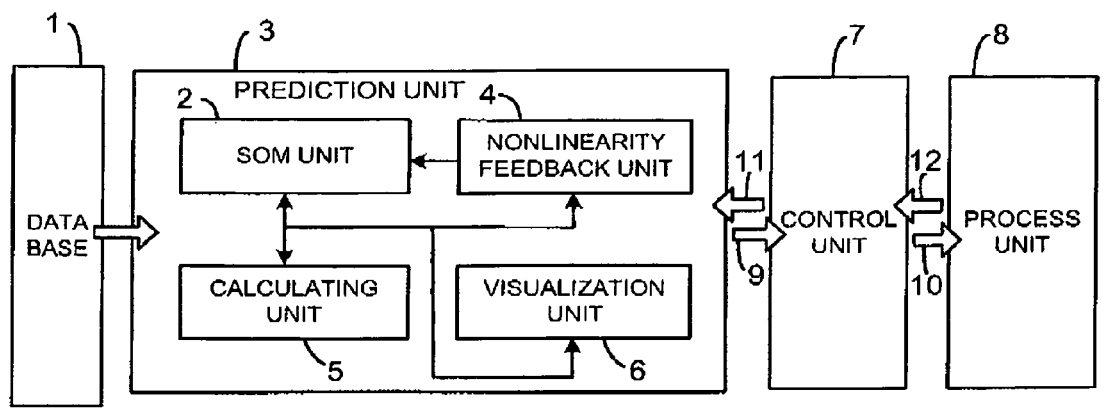
FIG. 1 shows a schematic, in the form of a block diagram, of a system for the generation of prognoses, the cooperation of the individual components of this prediction system being illustrated, in particular.

It is known that data may be illustrated in the SOM illustration such that it is possible for specific properties of the data distribution to be seen immediately from the SOM map. For the purpose of visualization, in this case the SOM map contains a grid of nodes ordered according to prescribed rules, for example in hexagonal form, the nodes of the grid representing the respective microclusters of the data distribution. An example of this is illustrated in the subsequent FIGS. 9, 10 and 11, which are explained in more detail.

In the course of the present method, large data volumes are now compressed in the SOM representation such that the nonlinear relationships in the representation are retained. As a result, those data sectors (microclusters) which contain the information relevant to the modeling can be selected individually and independently. The extremely short access times to these data sectors enable a substantially differentiated subdivision of the database, and thereby a targeted used of the included nonlinearities for the generation of the model.

The combination of the statistical calculus with suitably selected data sectors consequently permits information present in the nonlinear relationships to be used in conjunction with safeguarding of statistical requirements relating to quality and significance. The selection of the local data sectors, that is to say the receptive regions, is optimized in this case for obtaining prognosis models that are as efficient as possible.

A set of all the optimized local regression models can be used to make a statement as to how far the fundamental data representation is suitable for representing the nonlinear relationships of the variables to the target variable (nonlinearity analysis). The representation parameters of the SOM data compression (that is to say internal scalings) can be optimized therefrom in an iterative step so as to obtain an improved resolving power for the nonlinearities, and this leads in consequence to local prognosis models that are more accurate.

The particular type of SOM data representation then permits the visualization of all the local model parameters in an image. The safeguarding of the validity and efficiency of the entire prognosis model is simplified, accelerated and improved by the simultaneous comparison of parameters relevant to quality.

The prognosis model as a whole comprises the set of all the local prognosis models, which are to be regarded as logically or physically distributed. In the operational mode of the prognosis model, each new data record is firstly assigned to that microcluster which is closest to it. Thereupon, the local prognosis model of this microcluster is applied to the data record, and the prognosis result obtained is fed to the—preferably local—control or processing unit.

Specific SOM data representation or data compression occupies a central position in the present method. The historical process data stored in accordance with the illustration in FIG. 1 in a database 1 serve the purpose of SOM generation, carried out in an SOM unit 2 inside a prediction unit 3, in a first iteration step of the method. On the basis of this SOM, newly calculated scalings are fed back, as a result of a nonlinearity analysis carried out in a unit 4, to the SOM unit 2, that is to say to the data representation, in a second iteration step. These scalings optimize the SOM data representation with regard to taking optimum account of nonlinear relationships in the data for the prediction over the local data sectors, as will be explained in yet more detail below.

The generation of local linear regression models is performed in a calculating unit 5 by taking account of a receptive radius that is selected for the respective regression model in an optimum fashion with regard to the prognosis quality. The receptive radius is used to determine how many data records from the environment of a microcluster are used for the regression. The larger the radius, the more that data records from the surrounding nodes are used: all the data records are used when the radius turns to "infinity". The more distant nodes have a lesser influence because of Gaussian weighting functions, that are preferably used in this case.

The totality of all the local linear regression models over the data sectors in combination with the SOM constitutes the optimized prognosis model. This overall model can be represented optically by means of a visualization unit 6 and, as explained below in more detail with the aid of FIG. 8, it can, if appropriate, be distributed over individual control subunits and used for the purpose of generating from current process data for the respective control units specific prognoses with regard to the process results that are then used to control these process units.

For the sake of simplicity, FIG. 1 illustrates only a general control unit 7 that is connected to a general process unit 8. The process data transmission, which is performed in real time for the purpose of application to current process data, is illustrated by an arrow 9, and arrow 10 indicates the flow of control data; finally, arrows 11, 12 illustrate the feeding of current process data to the respectively preceding units.

Figure 2:
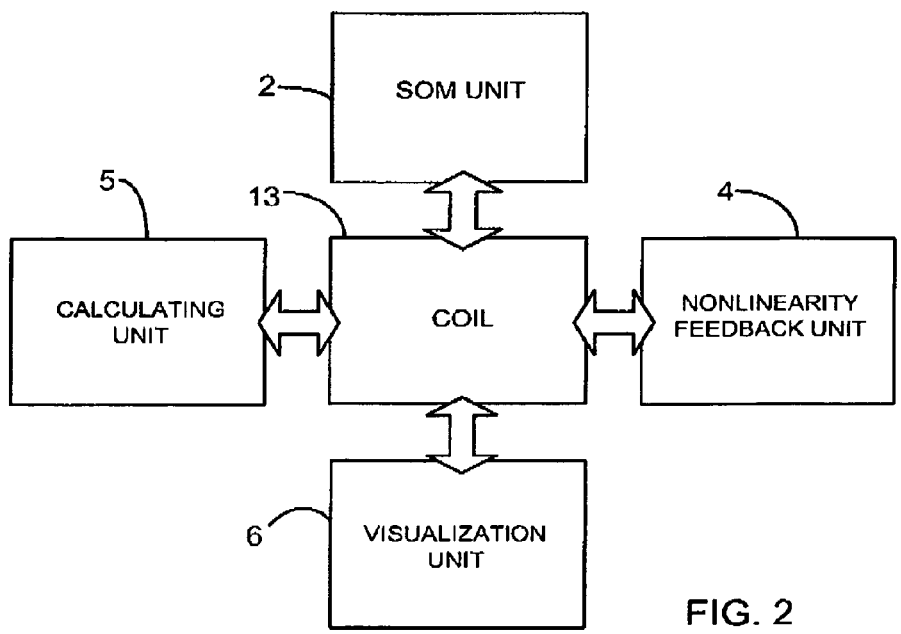
FIG. 2 shows a schematic of individual system modules in more detail.

The cooperation of the individual system components is illustrated in detail in FIG. 2 for the purpose of explanation. It is to be seen here that the SOM unit 2, which is provided for the representation and compression of data, is connected via a coil 13 of the prediction unit 3 to the other units such as, in particular, the nonlinearity feedback unit 4, from where the results of the local modeling are fed back to the data representation in order then to generate in the calculation unit 5 the optimized linear regression models over local data sectors. The visualization unit 6 then displays the SOM map thus generated, and also permits visual monitoring.

Figure 3:
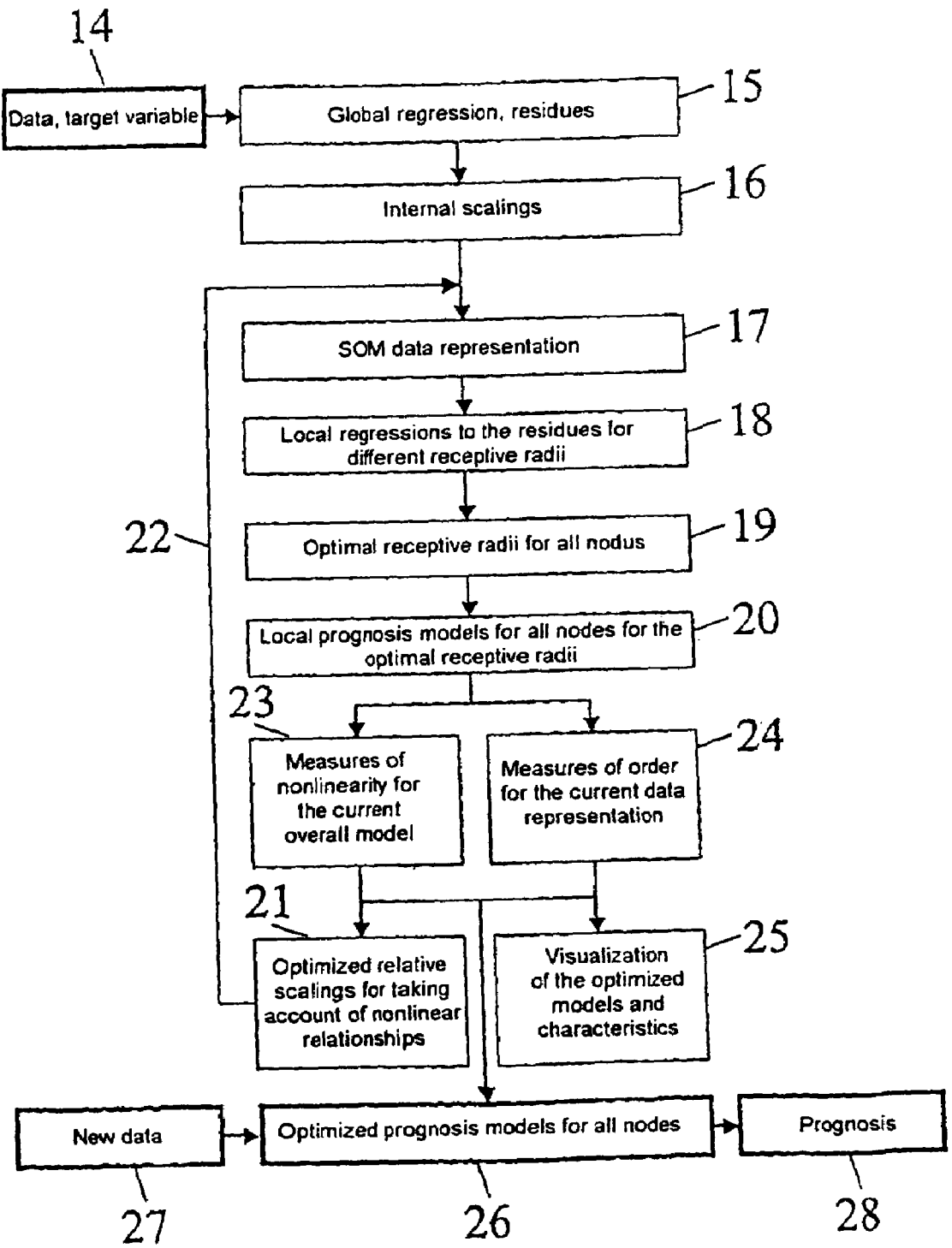
FIG. 3 shows a flowchart for illustrating the mode of procedure in the case of the method according to the invention.

FIG. 3 is a schematic of the sequence of the technique according to the invention, block 14 illustrating the data archiving and prescription of target data. A global regression and/or residues are calculated in a way known per se on the basis of these data in a first step (see block 15 in FIG. 3), after which internal scalings for obtaining the SOM representation are determined in accordance with block 16.

In detail, each data item based prognosis proceeds from a distribution of raw data that consists of K points $x_{k,j}^0$ (where k=1 ... k), each point having j components (where j=1 ... L). The prognosis is focused on a target variable $y_k$ that is in general a nonlinear function of the points $x_{k,j}^0$ and is a random variable in the statistical sense. In the present technique, the variables $x_{k,j}^0$ (the index k being omitted below for the sake of simplicity) having the variance $$\sigma_j^{0^2} = \mathrm{Var}(x_j^0)$$

Are first standardized and then (in accordance with step 16 in FIG. 3) scaled with new factors in accordance with the following relationship, these factors being termed internal scalings $\sigma_j$: the variables used below are therefore $$x_j = \sigma_j \cdot \frac{x_j^0 - \overline{x_j^0}}{\sigma_j^0}$$

The covariance matrix C of the scaled variables $x_j$ can always be diagonalized by an orthogonal matrix $A_{iq}$ (where I=1 ... L and q=1 ... Q):

$$C_{ij} = \frac{1}{K-1} \sum_{k=1}^{k} x_{kj} \cdot x_{kj},$$

in which case it holds that $$C = A \cdot C^{diag} \cdot A^T$$

and, for the eigenvalues $E_q$, that $$E_q = (C^{diag})_{qq}.$$

Moreover, the covariance matrix C can be decomposed as C=B·B, where $$B_y = \sum_{q=1}^{Q} A_{iq} \sqrt{E_q A_{jq}}.$$

The components $x_j$ of the data vector $\overline{x}$ are transformed into the principal component space by means of the transformation matrix $A_{iq}$:

$$x_q^j = \sum_{j=1}^{L} A_{jq} \cdot x_j,$$

where q=1 ... Q the number of the principal components.

A calculation aimed at the SOM data representation is now performed in accordance with block 17 in FIG. 3.

The generation of an SOM is performed in a way known per se using the Kohonen algorithm (Teuvo Kohonen, Self-Organizing Maps, Springer Verlag 2001). The nonlinear representation of the data distribution $\overline{x}_k \equiv x_{k,j}$ by an SOM is in this case essentially a function of the internal scalings $\sigma_j$ of the variables $x_j$. Thus, multiplying the internal scalings $\sigma_j$ with freely determinable factors $\pi_j$ changes the data representation, which is yielded from the new scalings, and specifically in accordance with $\sigma'_j = \sigma_j \cdot \pi_j$.

The SOM data representation can be used to define subregions of data. If an SOM consists of N nodes with representing vectors $\overline{m}_l$, where l=1 ... N, a subset of data can be selected by virtue of the fact that it lies inside a receptive radius r outside a specific node l:

$$\{\overline{x}_{kl}\}: |\overline{x}_{kl} - \overline{m}_l| = \min \text{ and } l' \in U_n(l), k_l = 1 \ldots K,$$

where
$\overline{m}_{l'}$=representing vector of the node l', and
$U_r = \{l'\}$ ... environment of the node l, in which it holds that:
$\|l-l'\| \leq r$.

The individual variables $x_j$ are resolved with different degrees of effectiveness in a given SOM data representation. In the present method, the order of the SOM with reference to the variables $x_j$ is described for a prescribed, receptive radius r by the mean range $\lambda_j$:

$$\lambda_j^2(r) = \frac{\overline{s_j^2}(r)}{s_j^2} \text{ where } s_j^2 := \sigma_j^2(K-1) \text{ and}$$

$$\overline{s_j^2}(r) := \sum_{l=1}^{N} \sigma_j^{2(l)} \cdot (K-1) \cdot \frac{H_l}{K_1},$$

in which case
$H_l$ is the number of data records in the node l,
$\sigma_j^{2(l)}$ is the variance of the variables $x_j$ in the local data volume $\{\overline{x}_{k_j}\}$ and
$H_l/K_l$ is a weighting factor for the node l.

Figure 4:
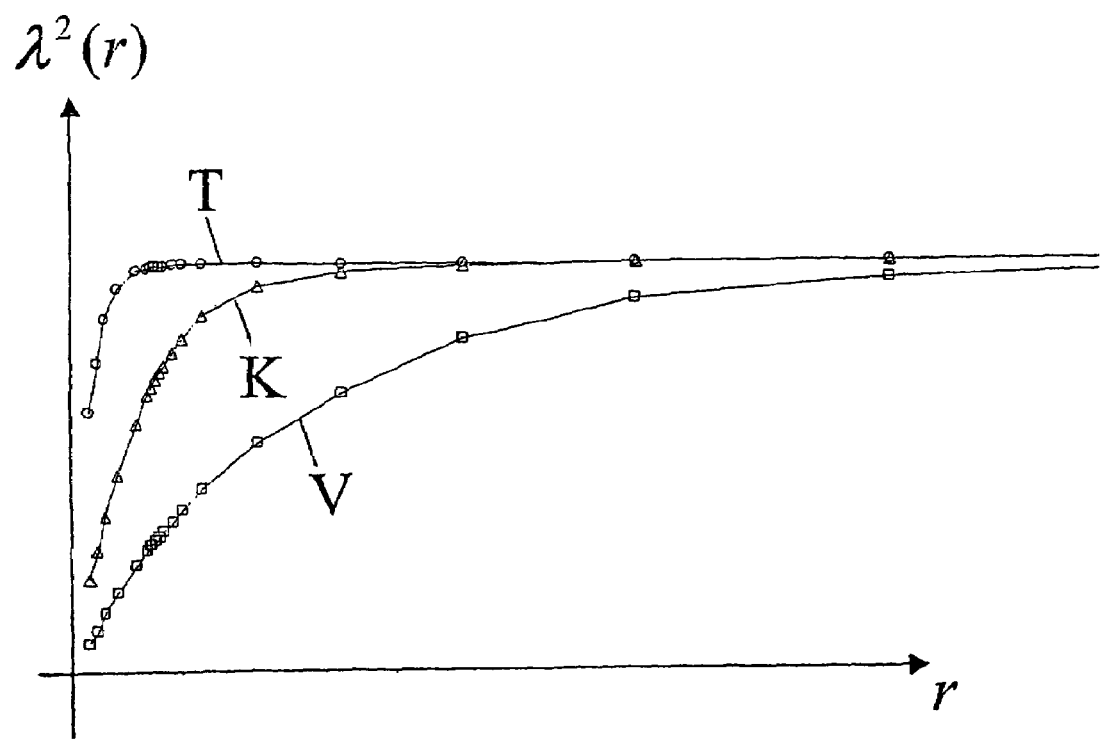
FIG. 4 shows a diagram for illustrating the mean range as a function of the receptive radius, for different variables.

Illustrated in a diagram in FIG. 4 by way of example is the square of the mean range $\lambda^2(r)$ as a function of the receptive radius r for a number of variables V, K and T, the fundamental example, explained in more detail below, here being that of a continuous steel casting in the case of which it is assumed that the target variable of "tensile strength" is a function of the parameters of strand removal rate V, removal temperature T and concentration K of chromium in the alloy composition, and forecasts relating to the steel quality (more precisely the tensile strength) are to be made on the basis of V, T and K data.

Given a fixed receptive radius $r_l$, it is clear that it holds for the range value $\lambda_j^2$—arranged over all the nodes—that:
$\lambda_j \to 0$ ... complete order of the SOM within the receptive radius $r_l$ as regards the variable $x_j$, and
$\lambda_j \to 1$ ... complete loss of information for local regression in terms of the variables $x_j$ within the receptive radius $r_l$ with reference to global nonlinearities in $x_j$.

In order to obtain as balanced as possible an SOM as starting point for the following steps, internal scalings can preferably be determined by a method that is suitable for compensating any correlations in the data distribution.

These compensating factors $\pi_j^{comp}$ for each variable j are calculated such that the distance measure in the given data space comes as close as possible to the distance measure in the standardized principal component space (Mahalanobis distance). This is fulfilled when:

$$\pi_j^{comp} = \frac{1}{C_{jj}} \sum_{q=1}^{Q} \left( A_{jq}^2 \cdot \sqrt{E_q} \right)$$

As an alternative to these factors, or in addition thereto, starting values for the scalings can also be used from preceding univariate nonlinearity analyses of the residues.

A regression of all K data points to the target variable y is denoted as global regression (compare step 15 in FIG. 3). The estimated regression coefficients $\beta_0$, $\beta_j$ for the estimator $\hat{y}$ of the target variable y, where $$\hat{y}_k = \beta_0 + \beta_j \cdot x_{k,j},$$

are calculated on the basis of covariance matrix C in a conventional way (compare, for example, the so-called stepwise regression method or the complete regression method).

The residues $u_k$ of the global regression are yielded as $u_k = y_k - \hat{y}_k$.

On the basis of an SOM representation, a local regression to the residue $u_{k_l}$ can now be calculated for each subset of data points $\{x_{k_l}(r_l)\}$ that lies inside a receptive radius $r_l$ around the node l—compare step 18 in FIG. 3. If there is a nonlinear relationship between the target variable y and the variables $x_j$, the SOM representation was generated independently of the target variable y, and the local regression is significant with reference to the variables $x_j$, it is possible for a portion of the scattering (which has remained unexplained in global terms) in the residue u to be explained.

Figure 5:
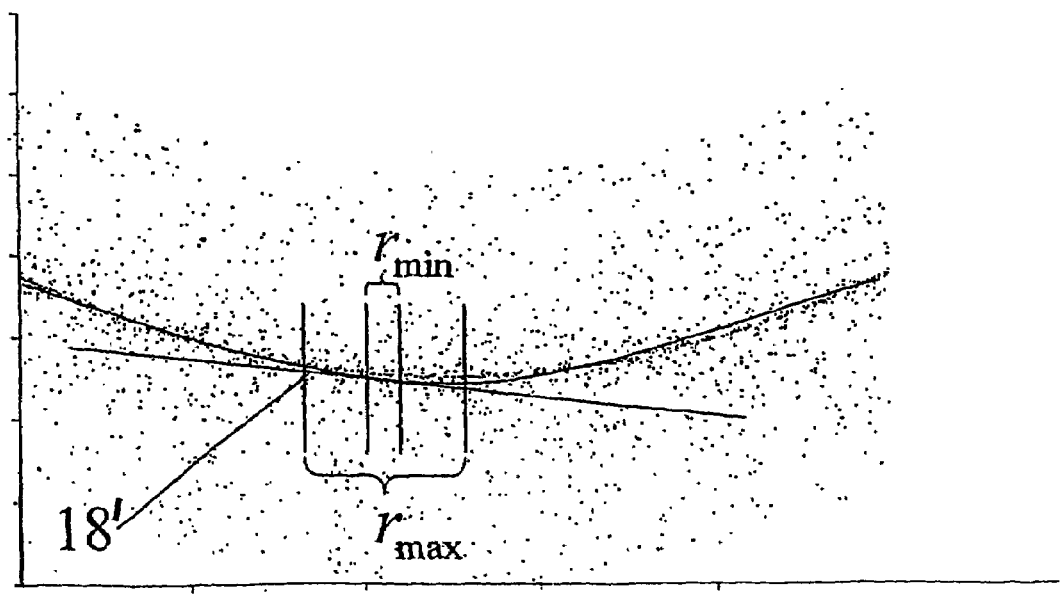
FIG. 5 shows a schematic of one dimension of a receptive region for a local linear regression.

A simplified example for such a local linear regression is shown in FIG. 5, where a multiplicity of data points and a total regression curve—not denoted in more detail—are shown, it being evident that the receptive radius r, which defines the receptive region for the regression, can be fixed between a minimum $r_{min}$ and a maximum $r_{max}$; these bounds $r_{min}$, $r_{max}$ are given by the significance and linearity, respectively, of the local model. The local regression line is denoted by 18'.

The local regression model obtained is valid for all the data records that lie in the receptive region of the respective node l; the best accuracy of prognosis for new data records consists in general in the center of the region, which are those H data records that are situated closest in Euclidian terms to the representing vector $\overline{m}_l$ (that is to say those that "belong" to the node l). It holds for this that:

$$l = \underset{l'}{\operatorname{argmin}} |\vec{x} - \overline{m}_{l'}|.$$

The local regression models can be calculated, in turn, on the basis of the local covariance matrices $C^{(l)}$ $$c_{ij}^{(l)} = \frac{1}{K_l - 1} \sum_{k_l=1}^{K_l} \left( x_{k_l}^i - \overline{x}_{(l)}^i \right) \cdot \left( x_{k_l}^j - \overline{x}_{(l)}^j \right)$$

to the local residues:

$$\hat{u}_{k_l} = \beta_0^{(l)} + \beta_j^{(l)} x_{k_l,j}.$$

The receptive regions can preferably also be formed with Gaussian weightings, the result of this being weighted mean values, variances and degrees of freedom. These details are ignored below for the sake of simplicity.

The SOM representation can now be used to determine the local regression (in accordance with step 18 in FIG. 3) for each set of given receptive radii $r_l$ relating to the nodes l, with l=1 ... N. The following squares of sums known per se can be formed in this case:

$$s_0^{2(l)} := \sum_{k_l=1}^{K_l} u_{k_l}^2 = s_{total}^{2(l)} + K_l^2 \cdot \overline{u}^{2(l)}$$

total sum of squares of the global residue in the receptive region;

$$\overline{u}^{(l)} := \frac{1}{K_l} \sum_{k_l} u_{k_l}$$

mean value of the global residue within r(l), also termed offset;

$$S_{total}^{2(l)} := \sum_{k_l} (u_{k_l} - \overline{u}^{(l)})^2$$

sum of squares of the global residue relative to the local mean value;

$$S_M^{2(l)} := S_g^{2(l)} + S_h^{2(l)}$$

total explained sum of squares in the local residue;

$$S_g^{2(l)} := \sum_{k_l} (\hat{u}_{k_l} - \overline{u}^{(l)})^2$$

sum of squares explained at the local regression;

$$S_h^{2(l)} := K_l \cdot \overline{u}^{2(l)}$$

sum of squares explained by the offset;

$$S_R^{2(l)} := \sum_{k_l} (u_{k_l} - \hat{u}_{k_l})^2$$

unexplained sum of squares, residue of 2nd order.

It holds for the unbiased estimator of the explained sums of squares (compare Kmenta, J. "Elements of Econometrics", 2nd edition, 1997, University of Michigan Press, Ann Arbor) that:

$$\hat{s}_g^{2(l)} = s_{total}^{2(l)} - s_R^{2(l)} \cdot \frac{K_l - 1}{K_l - J_l - 1}$$

$$\hat{s}_h^{2(l)} = s_h^{2(l)} - s_R^{2(l)} \cdot \frac{1}{K_l - J_l - 1}.$$

$J_l$ is the number of the regressors for the respective local regression with the receptive radius $r_l$ about the node l. In order for the regression to significantly explain a fraction of the total sum of squares of the residue, an overall test for the test variable F* known per se must be fulfilled as follows:

$$F^* = \frac{S_g^2 + S_h^2}{S_h^2} \cdot \frac{K - J - 1}{J + 1} > F_{1-\alpha, j+1, K-J-1}$$

for each $K=K_l$, $J=J_l$

A complete set of local regressions over the SOM representation to the residue u is denoted below as overall model (of the local regressions).

The nonlinear corrected measure of determination $R^2_{NL}$, which is composed of the contributions of the weighted, estimated explained variances of the individual local regressions as follows:

$$R_{NL}^2 := \frac{\overline{\hat{s}_M^2}}{\overline{s_0^2}},$$

can be regarded as deciding variable for the explanatory power of the overall model.

The summing up of the local contributions to form a total value is preferably performed by weighting with the number of the data records $H_l$ that are assigned to the respective node l, for example $$\overline{\hat{s}_M^2} := \sum_{l=1}^N \frac{H_l}{K_l} \cdot \hat{s}_M^{2(l)}.$$

Essential factors on which the explanatory power of the overall model depend are:
 a) the determination of optimal receptive radii $r_l$ for the local regressions;
 b) the determination of an SOM data representation that effectively resolves the nonlinear relationships;
 c) the combination of a) and b) so as to maximize the explanatory power of the overall model.

The accuracy of prognosis of the overall model depends (for a fixed, prescribed SOM data presentation) substantially on the selection of the receptive radii $r_l$. In accordance with step 19 in FIG. 3, optimal receptive radii $r_l$ are now determined for all nodes l, as a result of which the desired local prognosis models are then obtained in accordance with step 20 for all the nodes for the optimal receptive radii $r_l$.

Figure 6:
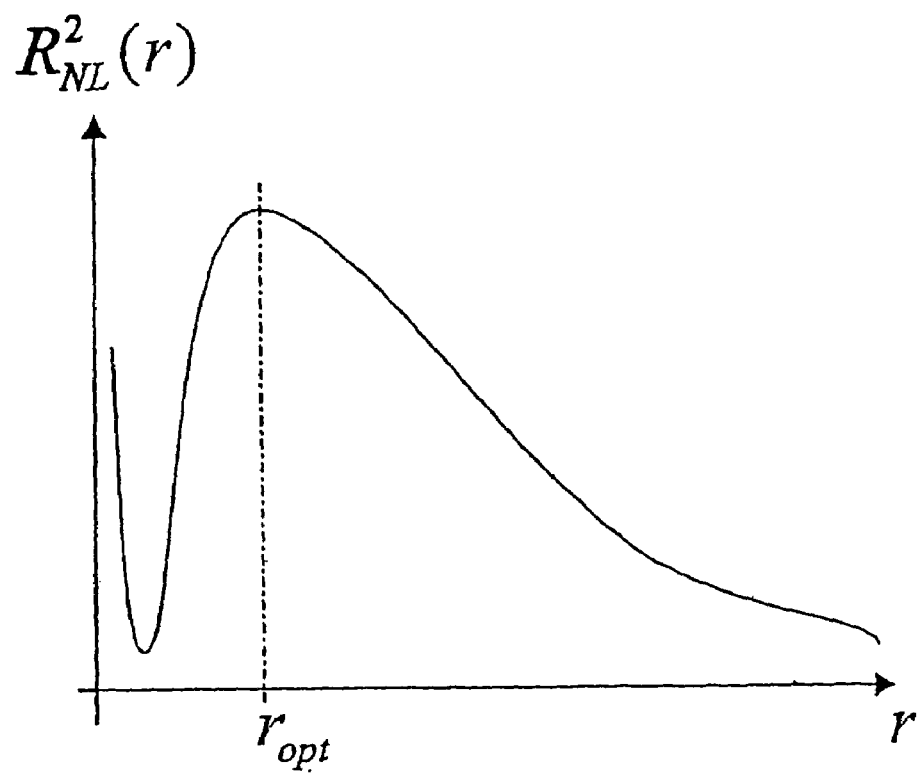
FIGS. 6 and 7 show two diagrams for the nonlinear measure of determination or the estimated error as a function of the receptive radius for the purpose of determining the optimal receptive radius.

The optimal values $r_{opt}$ for the receptive radii $r_l$ can preferably be determined by maximizing the value of $R_{NL}^2$ together with simultaneous variation of all the receptive radii $r_l=r$, compare also the illustration in FIG. 6, where the maximum is shown in a typical curve of $R_{NL}^2$ (r) for the radius $r_{opt}$.

Figure 7:
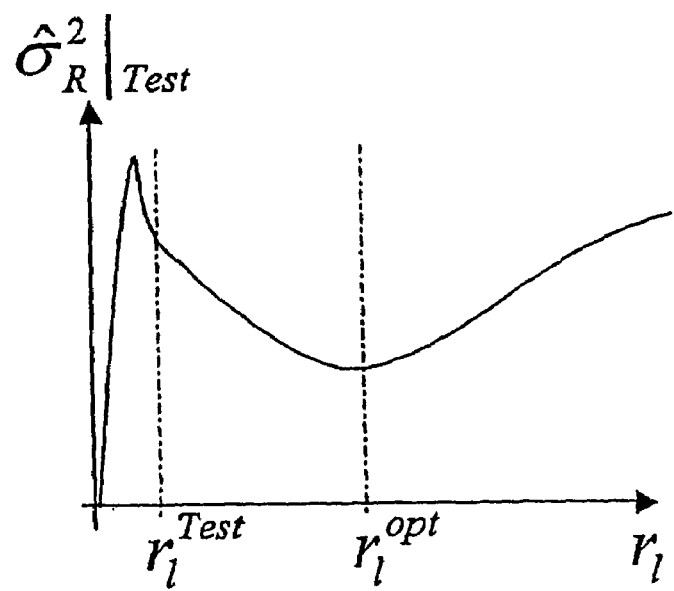

As an alternative to this, $r_l$ can also be determined individually for each node l by minimizing the estimated error $\hat{\sigma}_{R|Test}^2$ in the region of a testing set about the node l. By way of example, again, this alternative is shown in the schematic of FIG. 7, where a minimum for the radius $r_l^{opt}$ is illustrated in a typical curve profile $\hat{\sigma}_{R|Test}^2$.

For the determination of the respective receptive radius $r_l^{opt}$, this alternative requires prior determination of a testing set of radius $r_l^{Test}$ about the respective node l that is large enough to estimate the error in the region of the node l as significant. It is preferably required for this purpose that a local, significant regression model can be formed to the residue u on the basis of this set itself, and the relative error in the estimate of the explained variance σ for this set does not exceed a prescribed extent (so-called overfitting test).

An unbiased estimator for the error of the regression in the region of a "central" testing set is:

$$\hat{\sigma}_R^2|_{Test} := \frac{K_l}{H_l} \cdot \frac{1}{K_l - J_l - 1} \cdot \sum_{k_l=1}^{H_l} (u_{k_l} - \hat{u}_{k_l})^2.$$

The local prognosis models thus formed in $r_l^{opt}$ lead to a particularly good explanatory power of the overall model.

Furthermore, the explanatory power of the overall model depends substantially on how well it is possible to distinguish the nonlinear influence of all the individual variables $x_j$ on the target variable y (or on the residue u) for the local regressions in the data representation by the SOM. The task now is therefore to determine an advantageous SOM data representation.

The targeted variation of the internal scalings $\sigma_j$ (compare also step 21 in FIG. 3, with the iteration feedback loop 22) can be used to influence the data representation such that those variables that make large contributions to $R_{NL}^2$ are more strongly "ordered" by the SOM, and their nonlinear influence on $R_{NL}^2$ becomes capable of being more effectively calculated, and therefore of being optimized.

This requires—at least approximately—that the following be known:
 a) how the nonlinearly explained variance, that is to say the nonlinear corrected measure of determination $R_{NL}^2$, is determined by individual variables, compare also step 23 in FIG. 3;
 b) how the order of the variables $x_j$ in the SOM affects the variants that can be explained by the variables $x_j$; compare step 23 in FIG. 3; and
 c) how the order of the variables $x_j$ depends on the internal scalings $\sigma_I$ (compare step 24 in FIG. 3).

The assignment of the explained variance $\hat{s}_g^2$ (more precisely: the explained sum of squares) of a linear regression to individual variables is preferably performed by the following decomposition. It is assumed that the explained sum of squares of the parent population is $$s_g'^2 = \overline{\beta}' \cdot C \cdot \overline{\beta} \cdot (K-1).$$

By decomposing the covariance matrix $C=B^2$ (compare above), it is possible for the explained sum of squares $s'^2_q$ to be divided into a symmetrical sum of squares by component:

$$s'^2_g = \sum_{j=1}^{L} s'^2_{g,j} := (K-1) \sum_{j=1}^{L} \left( \sum_l B_{jl} \cdot \beta'_l \right)^2 = (K-1) \cdot \left( B\vec{\beta} \right)^2.$$

The summands $S'^2_{q,j}$ can be regarded as correlation-adjusted contributions of the variables $x_j$ to the explained variance $s'^2_g$. An unbiased estimator for the summands $S'^2_{g,j}$, is $$\hat{s}^2_{g,f} := (K-1) \left( \sum_l B_{jl} \beta_l \right)^2 - d_j \cdot \frac{s^2_g}{K-J-1}$$

with the definition $d_j := (B \cdot \mathfrak{C}_0^{-1} \cdot B)jj$.

If the regression was formed over a subset of the indices $j=1 \ldots J$ of the variables $x_j$, $j=1 \ldots L$, $\mathfrak{C}_0^{-1}$ is that matrix which results from inversion of that subregion of the covariance matrix $C$ which corresponds to those variables $x_j$, $j=1 \ldots J$ accepted into the regression, supplemented by zero entries in those sectors which correspond to the unaccepted variables.

On the basis of the correlation with the accepted variables, it then also holds for the variables not accepted into the regression that $\hat{s}^2_{g,j} \neq 0$, in general.

The contribution of a variable $x_j$ to the explained variance of the overall model by a weighted sum is determined as follows for a given set of local regressions:

$$\overline{\hat{s}^2_{g,j}} := \sum_{l=1}^{N} \frac{H_l}{K_l} \cdot \hat{s}^{2(l)}_{g,j}$$

Defining $$s^2_{p,j} := \begin{cases} \overline{\hat{s}^2_{g,j}} & \text{for } \overline{\hat{s}^2_{g,j}} > 0, \\ 0, & \text{otherwise} \end{cases}$$

for the positive fraction of the explained variance in the overall model yields $$I_j := \frac{s^2_{p,j}}{\sum_{i=1}^{L} s^2_{p,i}},$$

as identification number for the relative influence $I_j$ of the variables $x_j$ on the explained variance of the overall model.

The nonlinear measure of determination $R_{NL}^2$ can likewise be assigned, with the relative influence $I_j$, to the individual variables $x_j$, specifically in accordance with the relationship $$R_{NL,j}^2 := I_j \cdot R_{NL}^2.$$

This decomposition is preferably used to describe the contributions of individual variables to the nonlinear measure of determination of an overall model formed from a set of local regressions.

As already mentioned and now explained below, the explainable variance is dependent on the order of the SOM.

In order to simplify the description, it will be assumed below that the data distribution has been transformed into the space of the principal components, or that it holds in terms equivalent thereto that:

$$c_{ij} := (\text{diag})_{ij}.$$

The loss of information by the lack of order of the data representation of the SOM with regard to the variables $x_j$ can be expressed by the average range $\lambda_j$ (compare above). The relationship between the loss of explainable variance and the range $\lambda_j$ can be approximated empirically by a loss function $D(\lambda_j^2)$ in accordance with the following relationship:

$$D(\lambda_j^2) := \frac{R_{NL}^2(\lambda_j^2)}{R_{NL}^2(0)} \approx 1 - \lambda_j^2.$$

Those variables $x_j$ that have a strong influence on the explained variance of the target variable y or on the residue u are more strongly weighted in the present method, that is to say are provided with a larger scaling factor such that the nonlinear dependence of variables $x_j$ is more effectively taken into account, and thus the nonlinear measure of determination $R_{NL}^2$ can be maximized.

It is assumed for the investigation now following of the dependence of the average range of the internal scalings for the SOM that the internal scalings $\sigma_q$ of the transformed data distribution are present in accordance with the relationship $x_{k,q} = A_{iq} \cdot x_{k,i}$.

In the principal component space, the ranges $\lambda_q$ depend in simplest approximation on $\sigma_q$ in a form that can be heuristically approximated by the following functional relationship:

$$\lambda_q(\sigma_1, \ldots \sigma_Q, r_1) \approx \tanh \left( const \cdot r_i \cdot \frac{\sigma_q^{-2}}{\sum_{q'}^{Q} \sigma_1^{-2}} \right)$$

This relationship $\lambda_q (\sigma_q)$ is sufficiently accurate to enable an iterative maximization (see loop 22 in FIG. 3) of the nonlinear measure of determination $R_{NL}^2$ by varying the internal scalings $\sigma_q$.

The steps explained above for determining an advantageous data representation are now combined with the optimization of the local receptive regions such that the nonlinear explained variance in the residue is maximized, that is to say the accuracy of prognosis of the overall model is optimized, as will now be explained in more detail.

It will be assumed below for the purpose of simplification that the data distribution has again been transformed into principal components. The approximate precondition that the loss functions $D(\lambda_q^2)$ are independent of one another use the following for the variance fraction that can be explained to a maximum extent by the variable $x_q$:

$$R_{NL,q}^2(0) = \frac{I_q}{D(\lambda^2)} \cdot R_{NL}^2$$

Given a change in the internal scalings $\sigma_q \to \sigma'_q$, the consequence of this is a relative change $\psi$ in the explained variance in the overall model, that is to say in $R_{NL}^2$ in accordance with:

$$\Psi(\sigma'_1, \ldots \sigma'_Q) = \sum_{q=1}^{Q} I_q \cdot \frac{D(\lambda_q^2)}{D(\lambda_q^2)}.$$

$R_{NL}^2$ can now be maximized iteratively or explicitly by varying $\sigma'_q$. This is preferably performed by parametric approximation of the condition (see block 21 in FIG. 3) $\psi(\sigma'_1, \ldots \sigma'_q) \to \max$, on the basis of the partial derivatives $$\frac{\partial \psi}{\partial \sigma'_q}$$

(so-called hill climbing), from which there follows a new set of $\lambda'_q$ and, from this, a set of scalings $\sigma'_q$. These have the form $$\sigma'^2_q = \sigma^2_q \frac{\operatorname{arctanh}(\lambda_q)}{\operatorname{arctanh}(\lambda'_q)}.$$

These new scalings lead to a new SOM representation of the data that more effectively resolves the nonlinearities in the relationship $y(x_q)$ than on the basis of the scalings in the previous iteration step.

Repeated application of the rescalings $\sigma_q \to \sigma'_q$ (loop 22 in FIG. 3) thus delivers a successive improvement of the data representation in which the accuracy of prognosis of the overall model is maximized by the optimization of the receptive ranges.

The optimized prognosis models and characteristics obtained are preferably also visualized, compare block 25 in FIG. 3, in order to permit additional validation of the overall model.

In accordance with block 26 in FIG. 3, the optimized prognosis models obtained in this way for all the nodes are applied in an appropriate way to new data (see block 27 in FIG. 3) in order thus to attain an optimized prognosis (block 28). In this case, the local prognosis model of that node is respectively applied to the respective new data record whose representative is closest to the data record (compare above).

The sequence described above in general is explained in more detail below in a concrete exemplary application for controlling a continuous steel casting—having the variables ($x_1$ to $x_3$): temperature T (strand shell), strand removal rate V and alloying constituent concentration K (for chromium)—, the target variable being a specific steel quality measure, that is to say the tensile strength of the steel, for example, The steel production process is optimized in this case by the routine prognosis of the steel quality (the tensile strength). The predicted quality is used to vary the control parameters (the removal rate V in this case) continuously such that the actual tensile strength reaches the required level or quality.

It is assumed for the purpose of simplification that in this method only the three named control variables V, K and T of the process state determine the steel quality:

In this example, 26,014 data records were collected in the course of a production process as historical data for the generation of models. The individual variables having the mean values V=0.291 m/s K=2.23% Cr

T=540° C.

were standardized in each case in the data conditioning to a mean value=0 and a variance=1 and further processed in this form.

Figure 8:
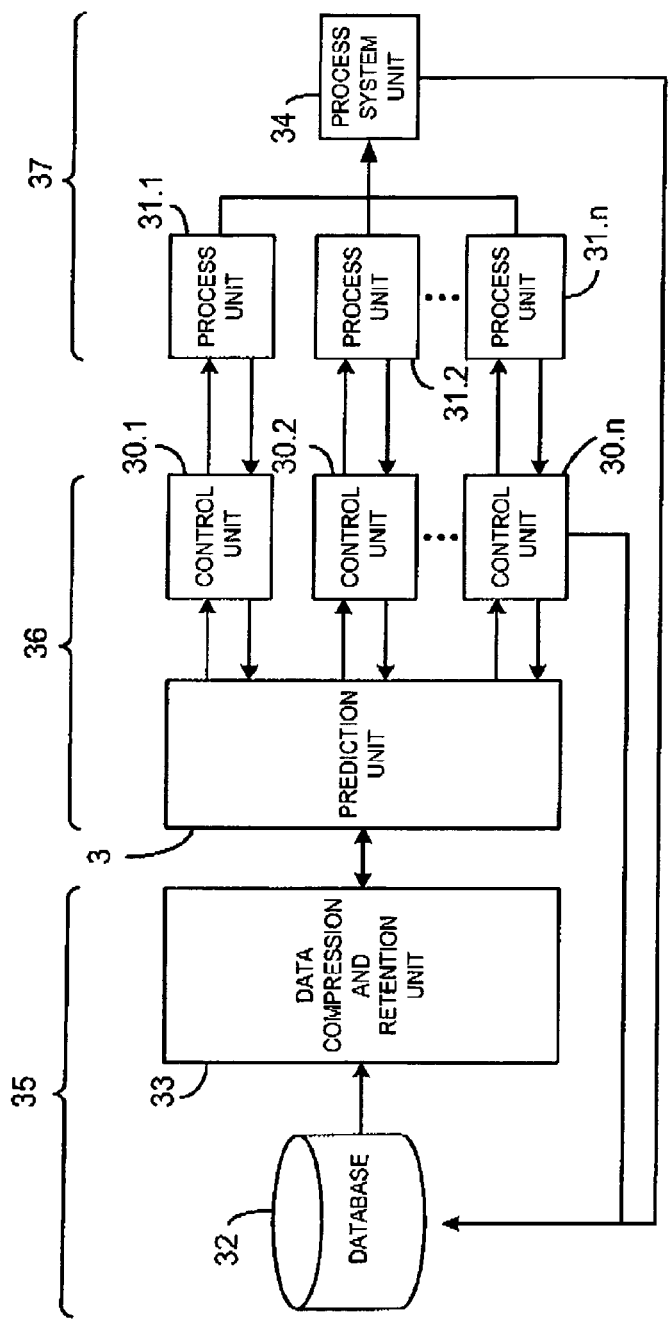
FIG. 8 shows a schematic illustration of the system according to the invention in an application for a process control, in a type of block diagram.

The local regression models calculated and optimized can be divided between individual associated, "local" control units 30.1 . . . 30.n, as shown in FIG. 8; the calculation of the prognosis values can take place in this case in the local control units 30.1 . . . 30.n and serves the purpose of controlling associated, connected process units 31.1-31.n. However, it is also possible to manage the overall model centrally and to calculate the prognosis values for the local control units 30.1 . . . 30.n centrally and subsequently distribute them as appropriate.

Also illustrated in FIG. 8, in addition, at 32 is a database for the process data that are conditioned in a data compression and representation unit 33 for the SOM representation. Illustrated at 3 in FIG. 8 is the prediction unit, which has already been explained with the aid of FIG. 1 and which is arranged upstream of the previously mentioned control units 30.1, 30.2 . . . 30.n. Connected to the latter are the process units 31.1, 31.2 . . . 31.n, which finally lead to a process system unit 34.

The components 32, 33 can be denoted as a device for data retentions, whereas the units 3 and 30.1, 30.2 . . . 30.n define a control system 36, and the process units 31.1, 31.2 . . . 31.n as well as the process system unit 34 define an operative system 37.

The present method will now be run through by way of example below with the aid of the steel casting sample addressed, which has the variables of concentration K, rate V and temperature T as well as the target variable of tensile strength. The aim in this case is to optimize the tensile strength by optimal setting of V on the basis of predicting the tensile strength as accurately as possible and selectively.

A complete, global regression of the tensile strength to all three variables K, V and T is initially formed in a first step of the method. This regression has a corrected measure of determination of 0.414, that is to say 41.4% of the total scatter can be explained by the global regression. Thereupon, the internal scalings $\sigma_j$ for compensating correlations were used to calculate an SOM that is to be seen in a somewhat simplified illustration in FIG. 9A (for the variable V=strand removal rate); FIG. 9B (for the variable K=concentration of Cr); and FIG. 9C (for the variable T=strand temperature upon removal). The simplification was undertaken, in particular, because the power of a color-coded representation of values was relinquished; instead of this, a five-step black/white representation was selected, white representing the lowest value, dotted areas the next lower etc, and black being the area filling for regions with the highest values.

In the illustration of FIG. 9, in particular in FIG. 9A (for the variable V, that is to say the removal rate), it is to be seen that the values are relatively strongly scattered over the entire region, that is to say are moderately well ordered.

Furthermore, in the illustrations of FIG. 9 (compare FIG. 9A in particular) one of the nodes has been depicted—at 1—together with a receptive region for the purpose of better understanding, there also being plotted in FIG. 9A an associated receptive radius r that defines the (circular) receptive region.

A consideration of the nonlinear influence of the individual variables for this representation indicates that the nonlinear influence of the removal rate V is greatest by comparison with the other variables. The following nonlinear influences $I_j$, where j=V, K, T, are calculated as follows for the individual variables:

$I_v=0.687$, $I_k=0.210$, $I_T=0.103$.

$R_{NL}^2=0.238$ is yielded as nonlinear measure of determination $R_{NL}^2$ of the first iteration. This value means that 23.8% of the variance remaining globally unexplained can still be explained by nonlinear (local) regressions.

Those internal scalings that yield the nonlinearities and measures of order of this iteration step for an improved SOM representation:

$\sigma'_v=1.634$, $\sigma'_k=0.711$, $\sigma'_T=0.543$, are derived therefrom (see the previous discussion).

The SOM data representation of the closest iteration is parameterized with these new internal scalings, the result being SOM representations that are modified in relation to FIG. 9, to be precise in accordance with FIG. 10a for V, in accordance with FIG. 10B for K and in accordance with FIG. 10C for T. It may be seen from these new SOM representations that the order has been raised inside FIG. 10A (for the removal rate V), whereas, in particular, the order in FIG. 10C (temperature) has been reduced. This corresponds to the requirement of more effectively detecting nonlinearities by means of the SOM representation and of being able to use them in the local regressions.

The internal scalings for the next iteration, whose result is illustrated in FIGS. 11A, 11B and 11C, are then calculated using the respective measures of nonlinearity and order as well as the nonlinear measure of determination $R_{NL}^2$. By way of example, in detail here the SOM representation of the variable V (removal rate) is shown in FIG. 11A, the standardized local regression coefficient $\beta_v^{(l)}$ for the removal rate is depicted in FIG. 11B against the tensile strength (=target variable), and the associated distribution of the optimal receptive radii for the local linear regression is illustrated in FIG. 11C over the totality of data.

As is to be seen from the illustration in FIG. 11A, the order inside the SOM for the variable V is further increased in the last iteration step.

Figure 12:
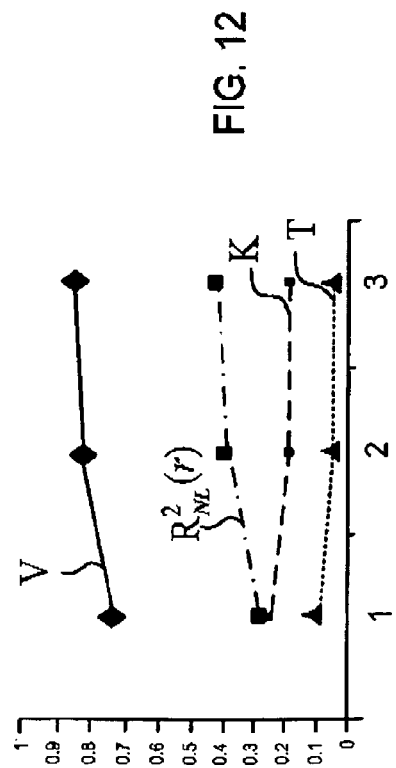
FIG. 12 shows a diagram that illustrates the change in the parameters on the basis of the iterations.

FIG. 12 shows the change in all the parameters K, V, T as well as $R_{NL}^2$ over the three iteration steps Nos. 1, 2 and 3 in a diagram.

In detail, FIG. 12 includes the representation of the profile of the nonlinear influences for the individual variables K, V, T, as well as of the resulting parameter $R_{NL}^2$ over the iteration steps 1, 2 and 3. After the 3rd step, the nonlinear measure of determination $R_{NL}^2$ can also be used to explain 34.7% of the remaining 58.6% of the globally unexplained variance as nonlinear, and so a total of 61.7% of the total scatter can now be explained.

The prognosis model is used in the production process by assigning each new process data record to that node which corresponds to the respective regions of state and/or quality of the process. For each of these regions, there is now a dedicated prognosis model that selectively describes the relationship between the parameters and the target value.

The assignment is performed in accordance with the smallest distance of the data record $x_j$ from the node l, using $$l = \underset{l'}{\mathrm{argmin}} |\vec{x} - \vec{m}_{l'}|.$$

The local prognosis model of this node is then applied to the data record, and the predicted tensile strength is used to set the optimal removal rate.

This prognosis, differentiated from the prior art, permits a more selective forecast of the tensile strength as a function of K, V and T in the respective local region of state. The application of the overall model to the new data in the course of the production process thus leads to an overall improvement in the quality of the steel product produced.

The invention can, of course, be applied in a similar way to the most varied production processes, in particular also in the case of production lines as well as to automatic distribution systems and other operative systems.

I claim:

1. A computerized method for generating prognoses for operative systems on a basis of multidimensional data records describing a state of a system, product and/or process, by utilizing the self-organizing maps method, which comprises:
   determining an ordered grid of nodes representing a data distribution;
   for taking into account nonlinearities in the data, effecting an internal scaling of variables based on a nonlinear influence of each variable on a prediction variable;
   determining local receptive regions assigned to the nodes and calculating local linear regressions on a basis of the local receptive regions;
   calculating optimized prediction values for controlling the operative system with the aid of a set of local prediction models thus obtained, by determining a respectively adequate node for each new data record and applying a local prediction model to the data record; and
   at least one of:
   outputting at least one of the local prediction models or optimized prediction values for display on a visualization unit; and
   controlling the operative system based on the calculated optimized prediction values.

2. The method according to claim 1, wherein the operative system is a set of control processes.

3. The method according to claim 1, wherein the data sets are descriptive of a state selected from the group consisting of system states, product states, and process states.

4. The method according to claim 1, which comprises forming for each variable a measure for an order of the variable in the SOM representation and forming a measure for a contribution of the variable to the explained variance, determining new internal scalings from the measures on a basis that an estimated change in the explained variance is maximized by varying the internal scalings, to thereby order the variables in a resulting SOM representation in accordance with respective contributions thereof to the explained variance and to more accurately resolve the existing nonlinearities.

5. The method according to claim 1, wherein the step of determining local receptive regions assigned to the nodes comprises respectively selecting a magnitude thereof to be so large that the explained variance of the local regression is at a maximum, while simultaneously safeguarding a significance and a stability in the region of the node.

6. The method according to claim 5, wherein the step of determining local receptive regions assigned to the nodes comprises selecting in each case a receptive region, which is the smallest necessary receptive region, for a significance of the regression, and is the largest possible receptive region for maximizing an accuracy of the prognosis.

7. The method according to claim 1, which comprises performing the internal scaling iteratively.

8. The method according to claim 1, which comprises preliminarily subjecting supplied data in advance to compensating scaling to at least partially compensate for possible correlations between variables.

9. The method according to claim 8, wherein the compensating scaling comprises rescaling individual data sets, with values of a respective variable of all the data sets being standardized, thereafter transforming the data into a principal component space and calculating the compensating scalings of the individual variables on a basis that a distance measure in the original variable space differs minimally from a distance measure in the standardized principal component space.

10. The method according to claim 9, which comprises multiplicatively combining the compensating scaling with the internal scaling that takes account of the nonlinearities in the data, for forming a combined variable scaling on which a thusly modified SOM representation is based.

11. A system for generating prognoses for operative systems on a basis of multidimensional data records describing a state of a system, product and/or process, comprising:
a database for storing the data records;
a self-organizing maps (SOM) unit for determining an ordered grid of nodes representing a data distribution;
a nonlinearity feedback unit associated with said SOM unit and configured for internal scaling of variables in order to compensate a nonlinear influence thereof on a prediction variable;
a calculation unit associated with said SOM unit and configured for determining local linear regressions on a basis of local receptive regions assigned to the nodes;
a prediction unit configured to use local prediction models thus obtained as a basis for calculating optimized prognosis values by determining a respectively adequate node for each new data record and to apply the local prediction model to the respective data record; and
at least one of:
a visualization unit for visually displaying at least one of the local prediction models or optimized prediction values; and
at least one control unit for controlling the operative system based on the calculated optimized prediction values.

12. The system according to claim 11 configured to generate prognoses for control processes.

13. The system according to claim 11, which comprises a plurality of control units, assigned to individual process states, connected to said prediction unit and configured to predict process results that would arise from current process data.

14. The system according to claim 13, which comprises process units separately connected to said control units, said process units being configured to derive control parameters on a. basis of the predicted process results and of desired values for the process respectively to be carried out in the operative system.

15. A computerized method for generating prognoses for operative systems for automatic control of at least one of marketing measures, financial transactions and industrial production on a basis of multidimensional data records describing a state of a customer, system, product and/or process, by utilizing the self-organizing maps method, which comprises:

determining an ordered grid of nodes representing a data distribution;
for taking into account nonlinearities in the data, effecting an internal scaling of variables based on a nonlinear influence of each variable on a prediction variable;
determining local receptive regions assigned to the nodes and calculating local linear regressions on a basis of the local receptive regions;
calculating optimized prediction values for controlling the operative system with the aid of a set of local prediction models thus obtained, by determining a respectively adequate node for each new data record describing marketing, financial, production or processing properties, and applying a local prediction model to the data record; and
automatically controlling the operative system based on the calculated optimized prediction values.

16. The method according to claim 15, wherein the operative system is a set of control processes.

17. The method according to claim 15, wherein the data sets are descriptive of a state selected from the group consisting of system states, product states, and process states.

18. The method according to claim 15, which comprises forming for each variable a measure for an order of the variable in the SOM representation and forming a measure for a contribution of the variable to the explained variance, determining new internal scalings from the measures on a basis that an estimated change in the explained variance is maximized by varying, the internal scalings, to thereby order the variables in a resulting SOM representation in accordance with respective contributions thereof to the explained variance and to more accurately resolve the existing nonlinearities.

19. The method according to claim 15, wherein the step of determining local receptive regions assigned to the nodes comprises respectively selecting a magnitude thereof to be so large that the explained variance of the local regression is at a maximum, while simultaneously safeguarding a significance and a stability in the region of the node.

20. The method according to claim 19, wherein the step of determining local receptive regions assigned to the nodes comprises selecting in each case a receptive region, which is the smallest necessary receptive region, for a significance of the regression, and is the largest possible receptive region for maximizing an accuracy of the prognosis.

21. The method according to claim 15, which comprises performing the internal scaling iteratively.

22. The method according to claim 15, which comprises preliminarily subjecting supplied data in advance to compensating scaling to at least partially compensate for possible correlations between variables.

23. The method according to claim 22, wherein the compensating scaling comprises rescaling individual data sets, with values of a respective variable of all the data sets being standardized, thereafter transforming the data into a principal component space and calculating the compensating scalings of the individual variables on a basis that a distance measure in the original variable space differs minimally from a distance measure in the standardized principal component space.

24. The method according to claim 23, which comprises multiplicatively combining the compensating scaling with the internal scaling that takes account of the nonlinearities in the data, for forming a combined variable scaling on which a thusly modified SOM representation is based.

* * * * *